United States Patent
Shete et al.

(10) Patent No.: US 9,047,151 B1
(45) Date of Patent: Jun. 2, 2015

(54) METHODS AND SYSTEMS FOR PROCESSING COMMANDS BY A DEVICE INTERFACING WITH A COMPUTING SYSTEM

(71) Applicant: QLOGIC, Corporation, Aliso Viejo, CA (US)

(72) Inventors: Tanmay Pradip Shete, Pune (IN); Jagannatha Narayanaswami, Sunnyvale, CA (US); Nilesh Jagannath Lonari, Pune (IN); Narender Kumar, Pune (IN)

(73) Assignee: QLOGIC, Corporation, Aliso Viejo, CA (US)

( * ) Notice: Subject to any disclaimer, the term of this patent is extended or adjusted under 35 U.S.C. 154(b) by 225 days.

(21) Appl. No.: 13/689,607

(22) Filed: Nov. 29, 2012

(51) Int. Cl.
 *G06F 9/54* (2006.01)
(52) U.S. Cl.
 CPC ............... *G06F 9/546* (2013.01); *G06F 9/541* (2013.01)
(58) Field of Classification Search
 CPC ............... H04L 49/357; G06F 13/102; G06F 2003/0697; G06F 2009/45579
 USPC ................................ 719/321, 326
 See application file for complete search history.

(56) References Cited

U.S. PATENT DOCUMENTS

| | | | |
|---|---|---|---|
| 2008/0082696 A1* | 4/2008 | Bestler | 709/250 |
| 2010/0150174 A1* | 6/2010 | Bhide et al. | 370/474 |
| 2011/0173608 A1* | 7/2011 | Buragohain et al. | 718/1 |
| 2011/0246666 A1* | 10/2011 | Aloni et al. | 709/235 |
| 2012/0102245 A1* | 4/2012 | Gole et al. | 710/72 |
| 2012/0300611 A1* | 11/2012 | DeCusatis et al. | 370/216 |
| 2013/0132607 A1* | 5/2013 | Sinha et al. | 709/238 |

* cited by examiner

*Primary Examiner* — Brian W Wathen
(74) *Attorney, Agent, or Firm* — Klein, O'Neill & Singh, LLP

(57) ABSTRACT

Method and system for processing a command received from a processor executable computing entity from among a plurality of computing entities of a computing system that interfaces with a device is provided. The method includes receiving the command by a command processing module executed by a processor of the computing system; generating a command object for the command by the command processing module, where the command object format does not change regardless of a computing entity type or a command type; placing the command object in a command queue maintained by the command processing module; sending the command to a device in a same context as a context of the computing entity, when the command object is a first command object in the command queue with the command that is ready to be sent to the device; and sending the command to the device in a different context as the context of the computing entity, when the command object is not the first command object in the command queue with the command that is ready to be sent to the device.

20 Claims, 9 Drawing Sheets

METHODS AND SYSTEMS FOR PROCESSING COMMANDS BY A DEVICE INTERFACING WITH A COMPUTING SYSTEM

TECHNICAL FIELD

The present invention relates to computing systems.

BACKGROUND

Computing systems are commonly used today. A computing system often communicates with different devices using device drivers. Various entities, for example, processes, tasks, interrupt handlers and others communicate using a command-request-response (CRRI) interface in a device-driver communication model.

Conventional device-driver model that use a CRRI has challenges. For example, different entities may have their own distinct characteristics and they tend to use custom CRRIs, which has limited the development of a generic interface. This approach has limitations because managing multiple types of CRRI for different entities becomes complex and burdensome.

Furthermore, even when similar entities (i.e. the same entity type) use the same CRRI, then each entity can use the CRRI asynchronously to issue commands to a device. For example, two similar entities may issue commands to the same device/module at the same time for reading or writing data. The entities then have to coordinate the operations associated with the command to avoid any potential conflict. This can be inefficient especially when the entities have to perform various operations and also have to expend resources in synchronizing how the commands are being processed. If the operations are not synchronized then there may be possible conflicts, which can produce invalid results. Continuous efforts are being made for developing a generic framework for computing devices to communicate with each other.

SUMMARY

The various present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a machine implemented method for processing a command received from a processor executable computing entity from among a plurality of computing entities of a computing system that interfaces with a device is provided. The method includes receiving the command by a command processing module executed by a processor of the computing system; generating a command object for the command by the command processing module, where the command object format does not change regardless of a computing entity type or a command type; placing the command object in a command queue maintained by the command processing module; sending the command to a device in a same context as a context of the computing entity, when the command object is a first command object in the command queue with the command that is ready to be sent to the device; and sending the command to the device in a different context as the context of the computing entity, when the command object is not the first command object in the command queue with the command that is ready to be sent to the device In another embodiment, a system is provided. The system includes a computing system executing a plurality of computing entities for sending commands; a device interfacing with the computing system for receiving the commands and responding to the commands; a command processing module executed by the computing system having: an application programming interface configured to receive a command generated by one of the plurality of computing entities; generate a command object using a command object format that does not change regardless of a computing entity type or a command type; places the command object in a command queue maintained by the command processing module; and sends the command to the device in a same context as a context of the computing entity that sent the command, when the command object is a first command object in the command queue with the command that is ready to be sent to the device; and an interrupt handler that sends the command to the device in a different context as the context of the computing entity, when the command object is not the first command object in the command queue with the command that is ready to be sent to the device.

In yet another embodiment, a command processing module executed by a hardware based processor for a computing system that executes a plurality of computing entities for sending commands that are processed by a device interfacing with the computing system is provided. The module includes a processor executable application programming interface (API) configured to receive a command generated by one of the plurality of computing entities; generate a command object using a command object format that does not change regardless of a computing entity type or a command type; places the command object in a command queue maintained by the command processing module; and sends the command to the device in a same context as a context of the computing entity that sent the command, when the command object is a first command object in the command queue with the command that is ready to be sent to the device; and a processor executable interrupt handler interfacing with the device sends the command to the device in a different context as the context of the computing entity, when the command object is not the first command in the command queue with the command that is ready to be sent to the device.

This brief summary has been provided so that the nature of the disclosure may be understood quickly. A more complete understanding of the disclosure can be obtained by reference to the following detailed description of the embodiments thereof concerning the attached drawings.

BRIEF DESCRIPTION OF THE DRAWINGS

The various embodiments relating to facilitating communication between devices in a network now will be discussed in detail with an emphasis on highlighting the advantageous features. These novel and non-obvious embodiments are shown in the accompanying drawings, which are for illustrative purposes only. These drawings include the following figures, in which like numerals indicate like parts.

DETAILED DESCRIPTION

Figure 1A:
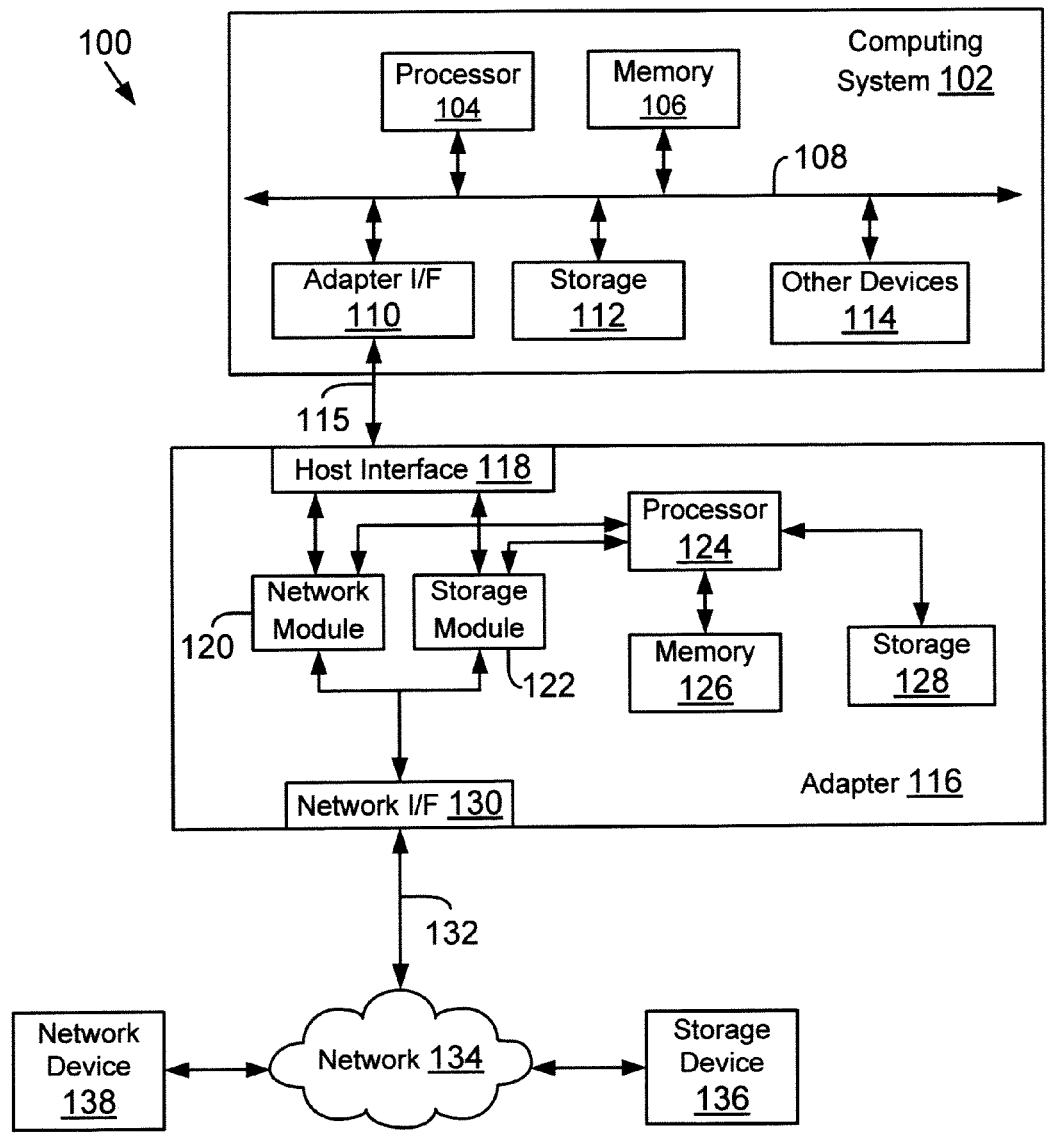
FIG. 1A is a functional block diagram of a computing system coupled to a network through an adapter.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The embodiments disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

System:

FIG. 1A is a block diagram of a system 100 configured for use with the present embodiments. The system 100 may include one or more computing system 102 (may also be referred to as "host system 102") coupled to another device, for example, an adapter 116 that interfaces with a network 134. The network 134 may include, for example, additional computing systems, servers, storage systems, etc. It is noteworthy that although the description below is based on the interaction between adapter 116 and host system 102, the embodiments disclosed herein are not limited to any particular adapter type or device type.

The computing system 102 may include one or more processors 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 executes computer-executable process steps and interfaces with an interconnect (or computer bus) 108. The computer bus 108 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

An adapter interface 110 facilitates the ability of the computing system 102 to interface with the adapter 116 via a link 115. The computing system 102 also includes other devices and interfaces 114, which may include a display device interface, a keyboard interface, a pointing device interface, etc. Details regarding the other devices 114 are not germane to the embodiments disclosed herein.

The computing system 102 may further include a storage device 112, which may be for example a hard disk, a CD-ROM, a non-volatile memory device (flash or memory stick) or any other mass storage device. Storage 112 may store operating system program files, application program files, and other files. Some of these files are stored on storage 112 using an installation program. For example, the processor 104 may execute computer-executable process steps of an installation program so that the processor 104 can properly execute the application program.

Memory 106 also interfaces to the computer bus 108 to provide the processor 104 with access to memory storage. Memory 106 may include random access main memory (RAM). When executing stored computer-executable process steps from storage 112, the processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1, link 115 and the adapter interface 110 couple the adapter 116 to the computing system 102. The adapter 116 may be configured to handle both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 Gbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapter 116 shown in FIG. 1 may be configured to operate as an FCOE adapter and may be referred to as FCOE adapter 116. QLogic Corporation, the assignee of the present application, provides one such adapter. The illustrated adapter 116, however, does not limit the scope of the present embodiments. The present embodiments may be practiced with adapters having different configurations.

Referring back to FIG. 1A, adapter 116 interfaces with the computing system 102 via the link 115 and a host interface 118. In one embodiment, the host interface 118 may be a PCI Express interface coupled to a PCI Express link having logic/circuitry for sending and receiving PCI-Express packets.

The adapter 116 may also include a processor 124 that executes firmware instructions out of memory 126 to control overall adapter operations. The adapter 116 may also include storage 128, which may be for example non-volatile memory, such as flash memory, or any other device. The storage 128 may store executable instructions and operating parameters that can be used for controlling adapter operations.

The adapter 116 includes a network module 120 for handling network traffic via a link 132. In one embodiment, the network module 120 includes logic and circuitry for handling network packets, for example, Ethernet or any other type of network packets. The network module 120 may include memory buffers (not shown) to temporarily store information received from other network devices 138 and transmitted to other network devices 138.

The adapter 116 may also include a storage module 122 for handling storage traffic to and from storage devices 136. The storage module 112 may further include memory buffers (not shown) to temporarily store information received from the storage devices 136 and transmitted by the adapter 116 to the storage devices 136. In one embodiment, the storage module 122 is configured to process storage traffic according to the Fibre Channel storage protocol, or any other protocol. It is noteworthy that adapter 116 may only have a network module 120 or a storage module 122. The embodiments described herein are not limited to any particular adapter type.

The adapter 116 also includes a network interface 130 that interfaces with link 132 via one or more ports (not shown). The network interface 130 includes logic and circuitry to receive information via the network link 132 and pass it to either the network module 120 or the storage module 122, depending on the packet type.

Figure 1B:
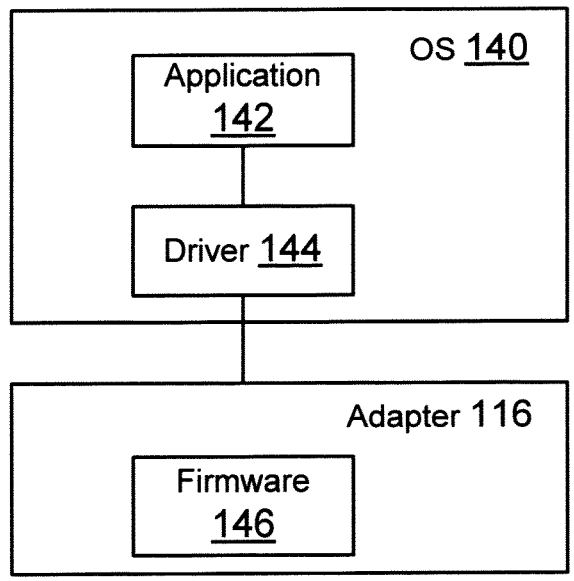
FIG. 1B shows a block diagram of a generic architecture used by the system of FIG. 1A.

FIG. 1B shows an example of a generic software architecture used by system 100. Processor 104 executes an operating system 140 for controlling the overall operations of computing system 102. The operating system may be Windows based, Linux operating system, Solaris, or any other operating system type. The embodiments disclosed herein are not limited to any particular operating system type.

An application 142 may be executed by processor 104 for performing certain functions. For example, application 142 may be an email program, a database application or any other application type. Application 142 may send a command to a driver 144 for performing an operation, for example, reading and/or writing data at another storage device. The driver 144 processes the request and communicates with firmware 146 executed by processor 124 of adapter 116. A component of adapter 116 then processes the request.

Figure 1C:
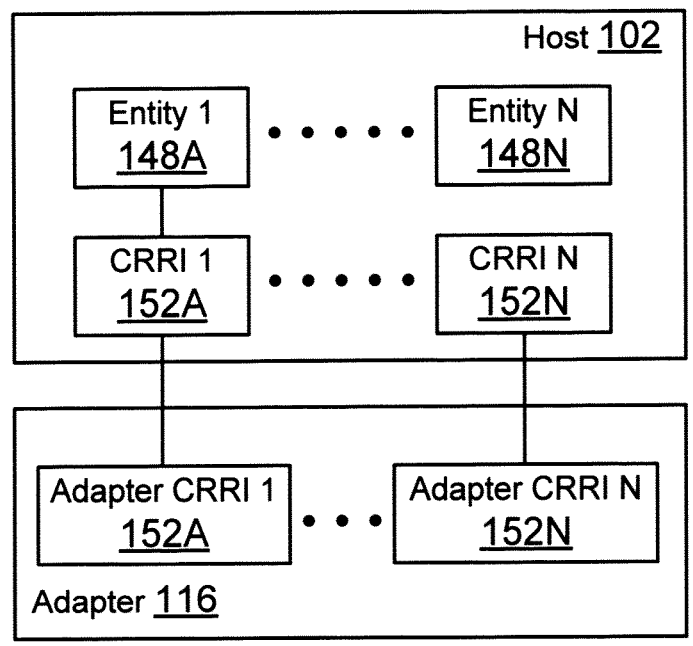
FIG. 1C shows a conventional system for handling commands from computing entities.

FIG. 1C shows a conventional approach for using a command-request-response interface (CRRI) between different components of host system 102 (referred to as entities) and components of adapter 116. In the conventional approach, a plurality of entities 148A-148N use a plurality of CRRIs 150A-150N to communicate with a plurality of CRRIs 152A-152N executed by adapter 116. Typically, each CRRI 148A-148N is dedicated to an entity type. Entities include processes that are executed by dedicated or generic systems, state machines, hardware components and others.

Typically, entities of similar type use the same CRRI to issue a command to a device. It is noteworthy that similar entity types may simultaneously issue commands using the same CRRI, but then the entities have to synchronize the responses for the issued commands to avoid any conflicts. This is undesirable because it would require the entities to expend resources in synchronization rather than performing the functions that they are designed to perform.

As the number of entities increase, it is inefficient to use dedicated CRRIs for each entity. Furthermore, it is inefficient when entities have to synchronize command processing and responses. The embodiments disclosed herein provide a unified, generic CRRI framework that allows different entities to communicate with adapter 116 or adapter 116 components without having to use dedicated or customized CRRIs. The embodiments described herein also do not require the entities to perform any synchronization tasks thus reducing that burden. This allows the entities to perform the designated tasks that they are designed to perform.

Figure 1D:
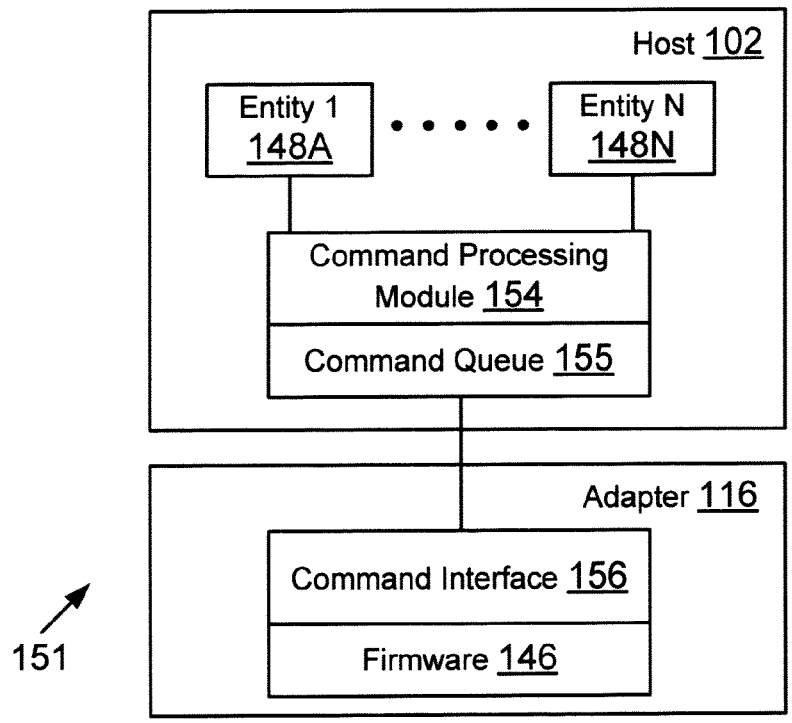
FIG. 1D shows a system for handling commands from computing entities, according to one embodiment.

System 151:

FIG. 1D shows a system 151, according to one embodiment using a standard format for sending commands regardless of an entity type. System 151 includes a command processing module 154 that is either a part of driver 144 or interfaces with driver 144, according to one embodiment. The command processing module interfaces with entities 148A-148N for receiving a command and then providing information in response to the command. The command processing module 154 uses a standard format for managing commands from different entities and maintains a command queue 155 for storing command objects, as described below in detail. Adapter 116 includes a command interface 156 that may be integrated with firmware 146 or interface with firmware 146. The command interface 156 communicates with command processing module 154, also described below in detail.

Figure 1E:
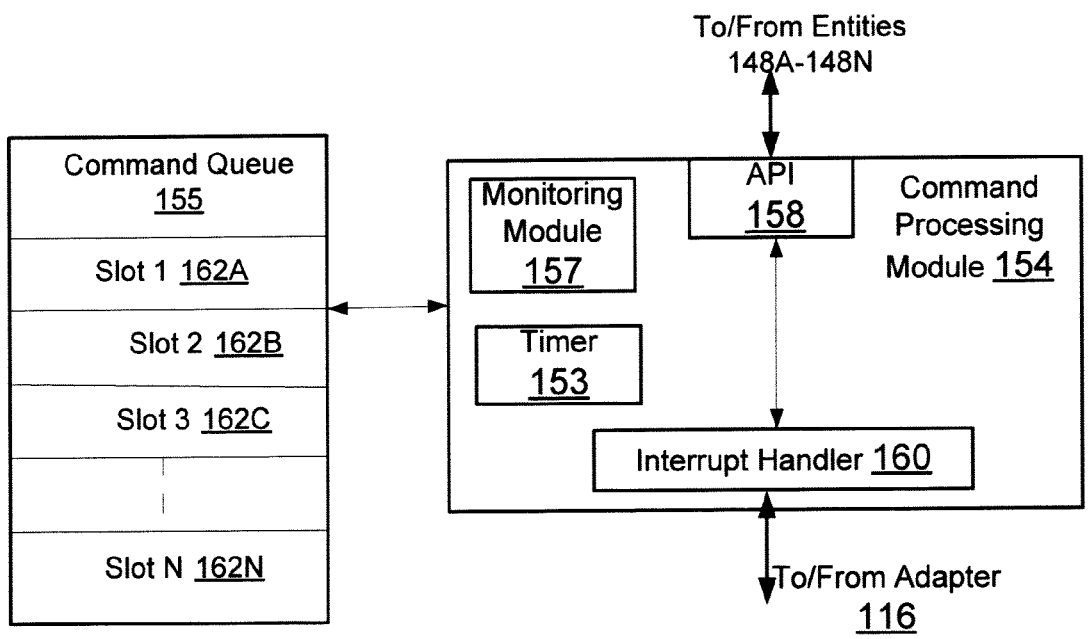
FIG. 1E shows an example of a command processing module, according to one embodiment.

FIG. 1E shows an example of the command processing module 154, according to one embodiment. The command processing module 154 includes an application programming interface (API) 158 that interfaces with the entities 148A-148N for receiving commands and providing information in response to the commands, when needed. The command processing module 154 also includes an interrupt handler 160 that is used to handle interrupts from the adapter 116 as well as perform some other functions described below in detail. The command processing module 154 maintains the command queue 155 that may include a plurality of slots 162A-162N for storing command objects that are generated by API 158 when a command is received from an entity. The format of the command object is the same regardless of the entity that sends the command.

The command processing module 154 also includes a timer module 153. API 158 may be used to assign a timestamp for a command when the command is received from an entity. The timer module 153 maintains the duration, while the command object is waiting for processing. The time stamp is compared to a "current time" and if the difference has reached a threshold "timeout" value, then a recovery process for the entity can be initiated. The recovery process will vary from entity to entity.

Command processing module 154 also includes a monitoring module 157 that monitors the command queue 155 to determine if a timeout has occurred for a command. As explained above, the time out is based on the difference of a current time and a threshold time.

In one embodiment, the command processing module 154 uses a common format 164 for command objects regardless of which entity is sending a command. The common format 164 includes a plurality of fields' 164A-164E described in detail below with respect to FIG. 1F.

Field 164A is used to specify the state of a command in a command object. For example, a command state may be ALLOC, INIT, REQ_SENT, RES_PENDING and COMPLETE. The states are set by API 158 or interrupt handler 160 depending on the state type. The different states provide a current status of a given command at any given time. The command states are described below in detail with respect to FIGS. 2A-2B and 3-4.

Field 164B is used to indicate whether an entity wants to wait for a command response. As an example, field 164B may be a wait_flag whose value indicates that the entity wants to wait for a command response. For example, if the wait_flag is set to "1", then it means that the entity wants to wait for the command response. If the wait_flag is set to "0", then the entity does not want to wait for the command response.

Field 164C provides information regarding the request from the entity. The entity issuing the command may populate this field. As an example, field 164C may include a command number and/or name, command parameters, command version, if any or any other information type.

Field 164D may be populated by command processing module 154 when a response is received from the adapter 116. As an example, field 164D may include a command number and/or name, result of command execution (e.g. pass, fail), response parameters, if any or any other information that is needed in response to a command.

Field 164E is a time stamp that is generated by command processing module 154 when a command is issued to adapter 116 or any of its modules. The time stamp may be used to monitor the overall efficiency of command processing, as described below in detail with respect to FIG. 5.

Before describing the various process flows of the present embodiments, the following describes the two CRRI types, CRRI A and CRRI B that are supported by the command object format 164 and command processing module 154. CRRI A is an interface type where a host system can issue a command only when a device sends a response to a previous command. CRRI B interface is an interface type that allows a host system to issue a command even before a response is received for a previous command.

Figure 2A:
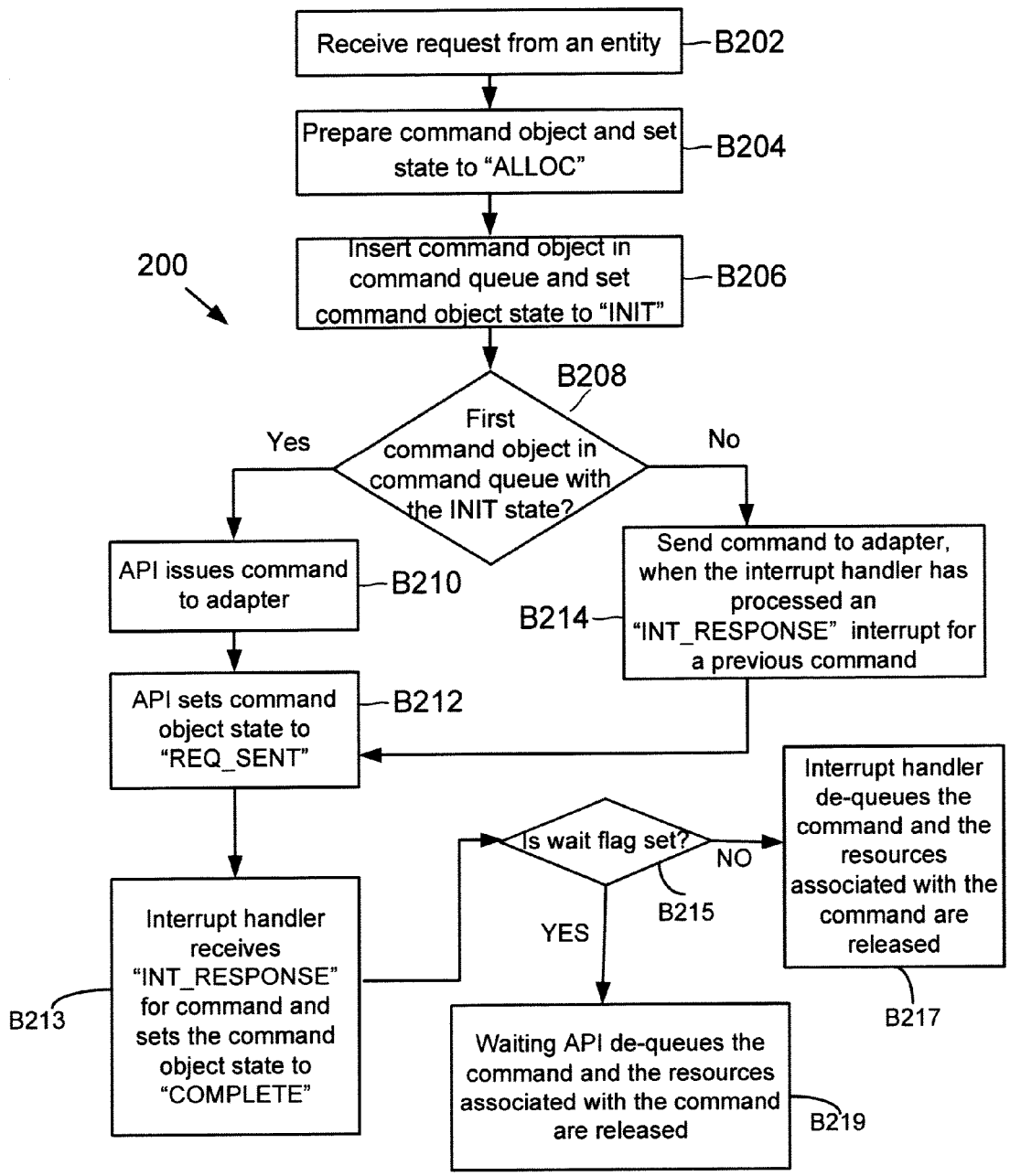
FIGS. 2A-2B show process flow diagrams, according to one embodiment.

FIG. 2A shows a process 200 that may be used for the CRRI A type interface, according to one embodiment. The process begins in block B202 when a request or command to perform an operation is received by API 158 from an entity. The command may be for performing an operation (for example, read or write operation), providing status or any other function. The embodiments disclosed herein are not limited to any particular command type or function.

In block B204, API 158 prepares a command object using the format 164 described above with respect to FIG. 1F. The initial state of the command is set to ALLOC. During this state appropriate memory is allocated to store the command. If the entity that sent the commands requires a wait for a response from adapter 116, then flag 164B is set to a certain value, for example, 1 such that command processing module 154 knows that it has to wait for a response. A timestamp is also inserted in the command object by API 158.

In block B206, API 158 places the command object in the command queue 155. The command state for the command is then changed to INIT by API 158, which means that the command is ready to be sent to adapter 116.

In block B208, API 158 checks the command queue 155 to determine if the inserted command object is the first object with the INIT state at the command queue 155. If it is the first command object, then in block B210, API 158 issues the command to the device and in block B212, sets the command state to REQ_SENT. This indicates that the command has been sent. It is noteworthy that since API 158 prepares the command, places the command and then sends the command in the same context as the entity that sent the command, the process is faster and more efficient.

In block B213, the interrupt handler 160 receives an interrupt "INT_RESPONSE" from the adapter 116. This indicates that the adapter 116 is ready to send a response for the command. The interrupt handler 160 then sets the state of the command object to COMPLETE, such that a next command object can be processed.

The manner in which the command is de-queued from the command queue 155 depends on whether the wait flag 164B is set or not as determined in block B215. If the wait flag is set, then in block B219, API 158 continues to poll for the state of the command object. The state is only changed when a response has been received by interrupt handler 160. Once the state is set, API 158 de-queues the command and the resources associated with the command (for example, memory storage space at command queue 155) are released so that the resources can be used for a next command.

If the wait flag is not set as determined in block B215, then in block B217, the interrupt handler 169 de-queues the command object from the command queue 155 after setting the COMPLETE state. Thereafter, the resources associated with the command are released.

Referring back to block B208, if the command object is not the first command object with the INIT state, then in block B214, the interrupt handler 160 sends the command to adapter 116, after an the INT_RESPONSE interrupt has been received for a previous response. For example, assume that the command object is the nth command object that is inserted in block B206. When a response is available for a n–1 command, the adapter 116 triggers the interrupt, INT_RESPONSE. The interrupt handler 160 receives the interrupt INT_RESPONSE for the n–1 command object from adapter 116 and then the nth command is sent to adapter 116 in a context that may be different from the context of the entity that sent the command. Thereafter, the process moves to block B212 that has been described above.

Figure 2B:
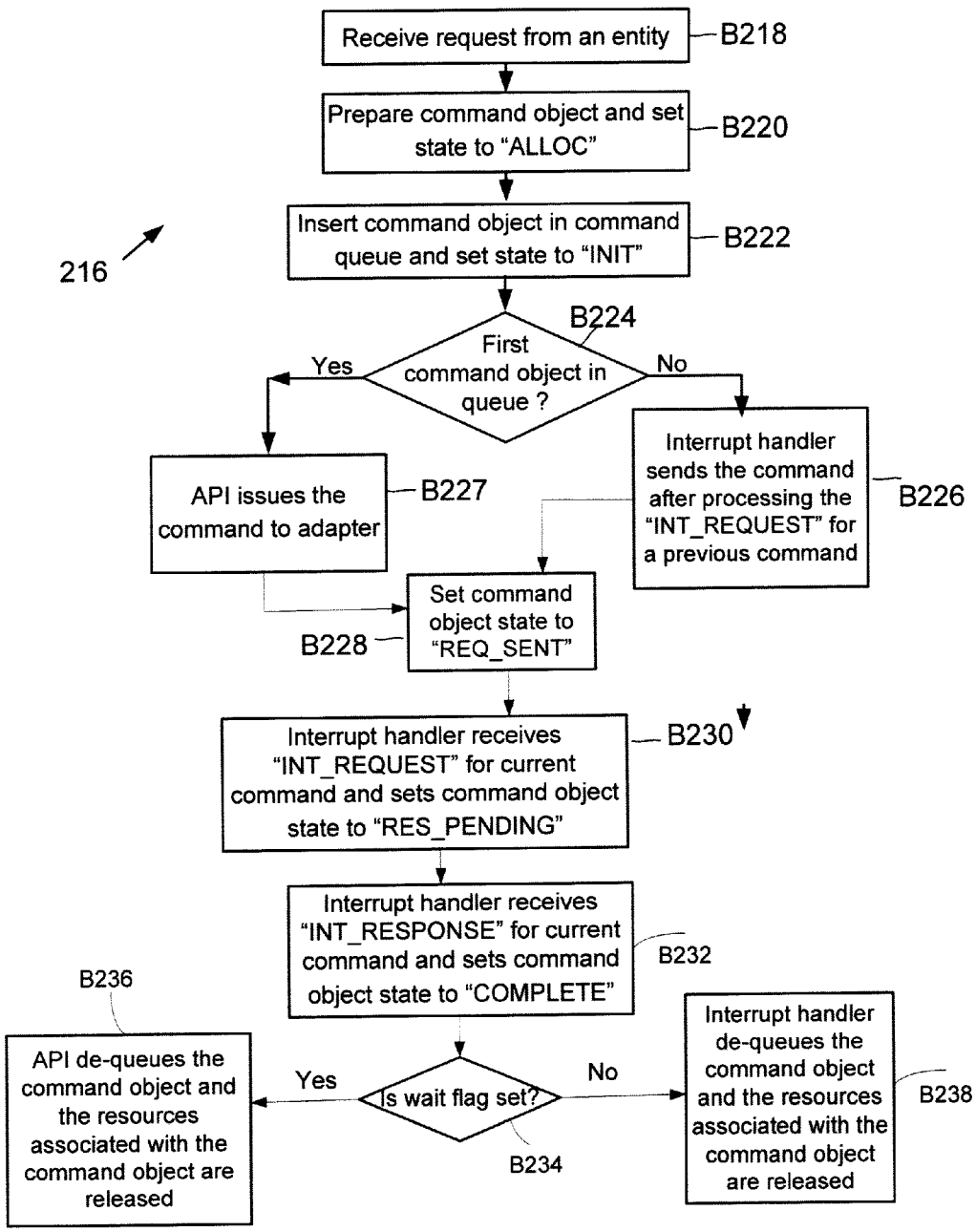

FIG. 2B shows a process 216 for the CRRI B type interface, according to one embodiment. It is noteworthy that some of the process blocks of process 216 are similar to the process 200 described above with respect to FIG. 2A. For example, process blocks B218, B220, B222 and B224 are similar to process blocks B202, B204, B206 and B208, respectively. Therefore, for brevity sake, the description of these process blocks has not been repeated.

If the command object as determined in block B224, is not the first command object in the command queue 155 with the INIT state, then in block B226, the interrupt handler 160 sends the command to the adapter 116 in a context that may be different from the context of the entity that sent the command, after an interrupt "INT_REQUEST" for a previous command object is received. For example, if the command object in block B222 is the mth command object, then the command is sent to adapter after the interrupt INT_REQUEST is received for the m−1 command. The INT_REQUEST is an interrupt type that is used for the CRRI B type interface. This interrupt indicates to the command processing module 154 that the adapter 116 has received the command object.

In block B228, the interrupt handler 160 sets the state of the command object to REQ_SENT, indicating that the request has been sent. In block B230, the interrupt handler receives the INT_REQUEST interrupt from adapter 116, indicating that the request was received. The interrupt handler 160 then sets the command object state to RES_PENDING.

In block B232, the interrupt handler 160 receives the interrupt INT_RESPONSE for the current response. This indicates that a response to the command sent in block B226 is ready. The interrupt handler 160 then sets the state of the command object to COMPLETE and the process moves to block B234 that is described below.

Referring back to block B224, if the command object is the first command with the INIT state, then in block B228, API 158 issues the command in block B227 in the same context as the entity that sent the command and thereafter, in block B228, API 158 sets the state to REQ_SENT. Thereafter, the process moves to block B230 that has been described above.

In block B234, the process determines if the wait flag is set for the command object. If yes, then in block B236, API 158 de-queues the command object and the resources associated with the command object are released for a next command object.

If the wait flag is not set, then in block B238, the interrupt handler 160 de-queues the command object and releases the resources associated with the command object.

Figure 3:
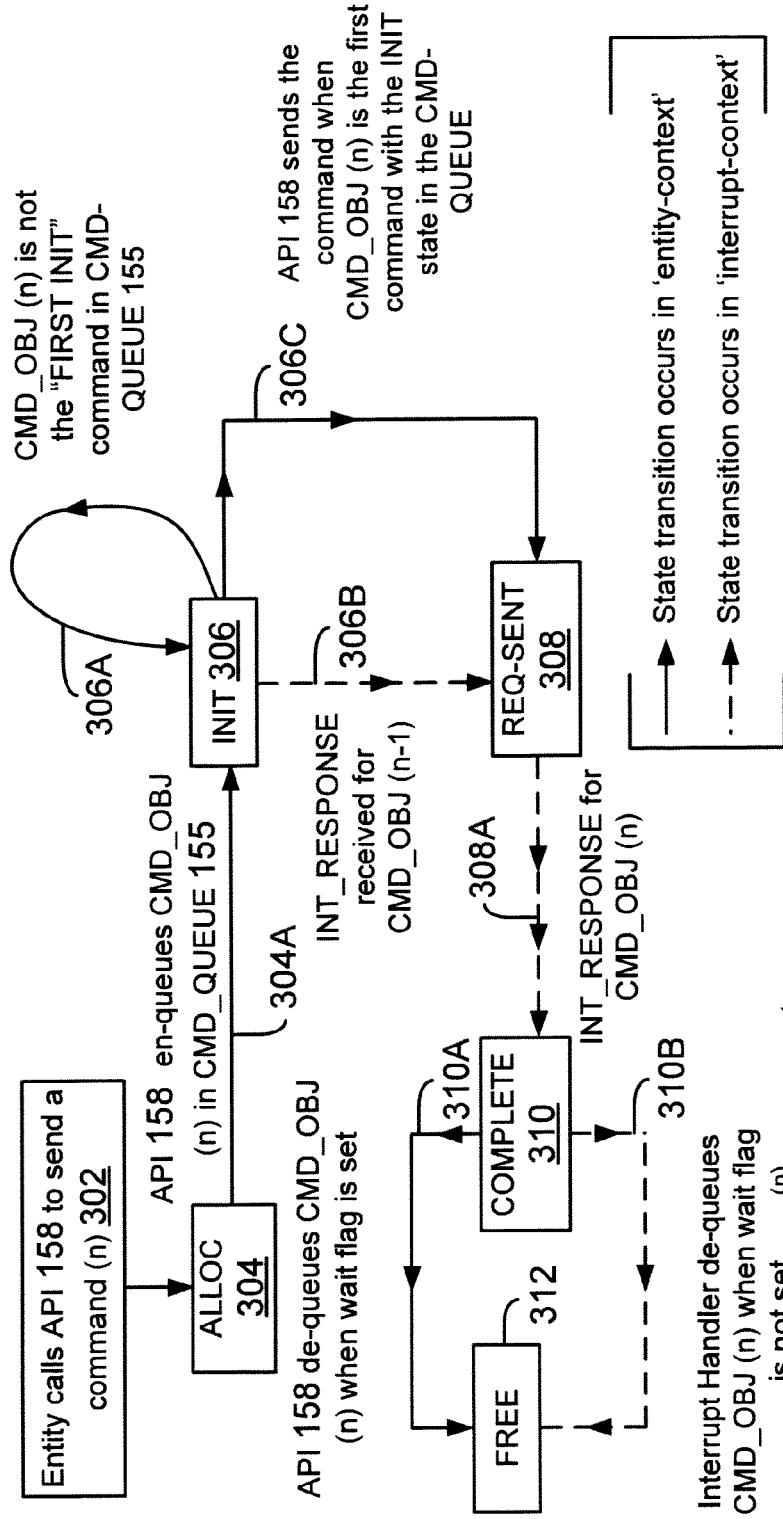
FIGS. 3 and 4 show state machine diagrams for implementing the process flow of FIGS. 2A-2B.

FIG. 3 shows a state machine diagram for one or more state machines used by command processing module 154 for executing the process blocks of FIG. 2A described above. The state machines may be located at API 158 and/or interrupt handler 160. The embodiments described herein are not limited to any particular location of the state machines or number of state machines.

The state machine operations begin in block 302 when an entity calls API 158 to send a command. This is similar to block B202 described above in detail.

The ALLOC state is then set in block 304 when API 158 prepares a command object (CMD_OBJ (n)). The INIT state is then set in block 306 after API 158 inserts the CMD_OBJ (n) at a location in command queue 155 as shown by solid line 304A. If the CMD_OBJ(n) is the first command object in command queue 155, then API 158 sends the command to adapter 116 and API 158 sets the command object state to REQ_SENT in block 308 as shown by the solid line 306C.

When the API 158 detects that the CMD_OBJ(n) is not the first command object in the command queue 155 with the INIT state, then it simply waits, as shown by the loop 306A, if the wait_flag is set, as described below. If the wait_flag is not set, then API 158 exits at this stage because the rest of the operations are handled by the interrupt handler 160 as described below.

When the CMD_OBJ(n) is not the first command object with the INIT state, then the process waits to receive the interrupt INT_RESPONSE from the adapter 116 for a previous command object, CMD_OBJ(n−1). When the interrupt is received, as shown by the dotted line 306B the command is sent to the adapter 116 and the command object state is set by the interrupt handler 160 to REQ_SENT in block 308.

After the adapter 116 processes the command for CMD_OBJ(n), the adapter sends the interrupt INT_RESPONSE for CMD_OBJ (n). When the interrupt is received by the interrupt handler 160, as indicated by the dotted line 308A, the COMPLETE state is set for CMD_OBJ(n) in block 310 by the interrupt handler 160. The command object is then de-queued by API 158 or interrupt handler 160 based on the wait_flag. For example, API 158 de-queues the command object CMD_OBJ(n), as shown by solid line 310A when the wait_flag is set. The interrupt handler 160 de-queues CMD_OBJ(n), as shown by dotted line 310B when the wait_flag is not set. The resources (for example, the memory location used for storing the command object) are then released and the state is set to FREE in block 312.

Figure 4:
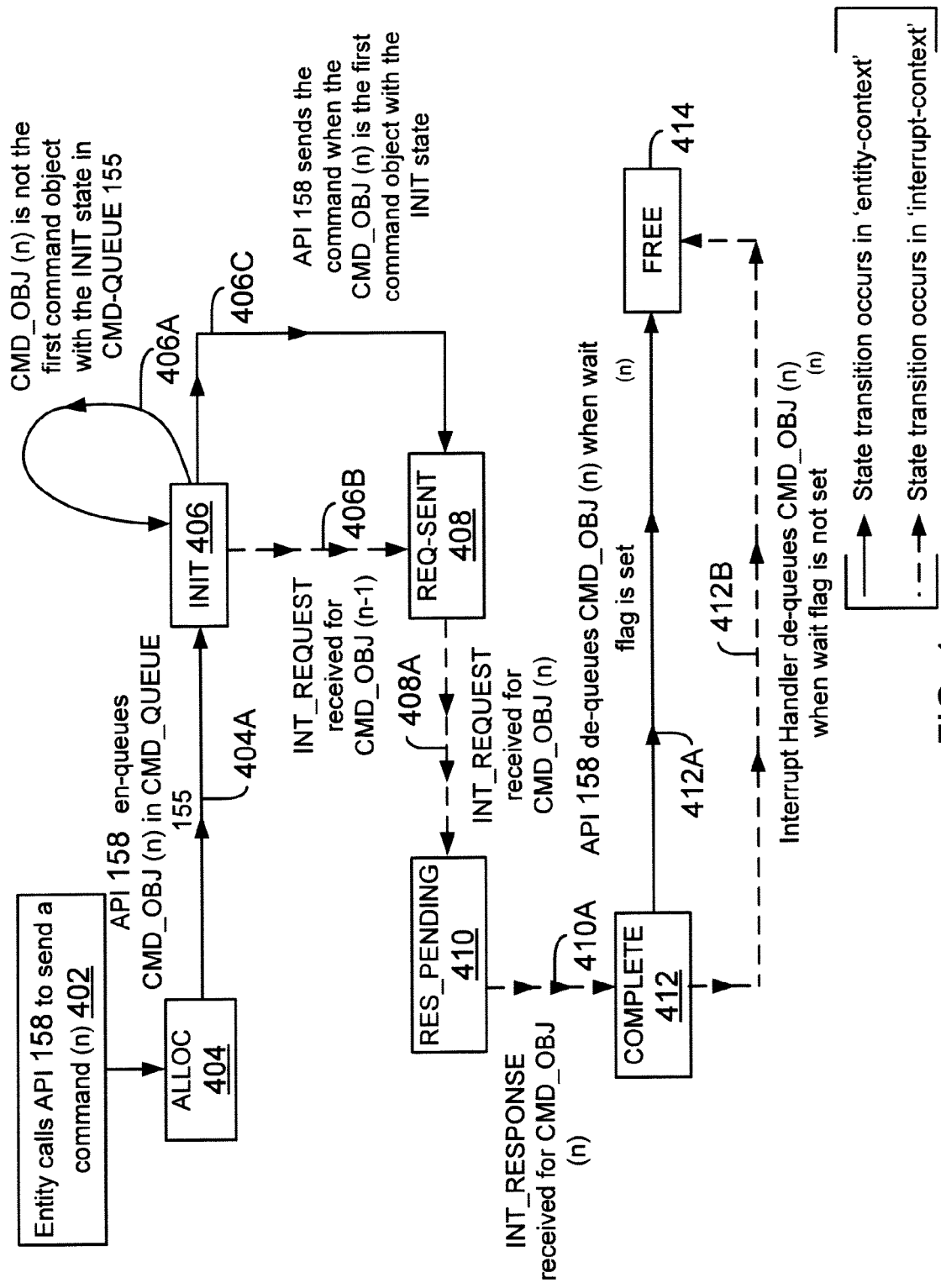

FIG. 4 shows a state machine diagram for executing the process steps of FIG. 2B for the CRRI B type interface. The process begins in block 402 (similar to block B218 of FIG. 2B) when an entity calls API 158 to send a command. API 158 prepares a CMD_OBJ(n) and sets the state to ALLOC in block 404. API 158 inserts the CMD_OBJ(n) in the command queue 155 as shown by the solid line 404A and changes the state of the command object to INIT in block 406. If the CMD_OBJ(n) is the first command object with the INIT state, then API 158 sends the command to the adapter 116, as shown by the solid line 406C.

If the CMD_OBJ(n) is not the first command with the INIT state, then API 158 waits, as shown by the loop 406A, if the wait flag is set. If the wait flag is not set, then API 158 exits at this stage.

When the CMD_OBJ(n) is not the first command object with the INIT state, then the process waits to receive the interrupt, INT_REQUEST for a previous command object CMD_OBJ(n−1). The INT_REQUEST indicates that the previous command has been received by adapter 116. The interrupt handler 160 then sends the CMD_OBJ (n) to adapter 116, as shown by the dotted line 406B. After the command object is sent, the state of the command object is set to REQ_SENT by the interrupt handler 160 in block 408.

Thereafter, the process waits to receive the interrupt, INIT_REQUEST for CMD_OBJ(n). When the interrupt is received from adapter 116 it is handled by interrupt handler 160 as shown by dotted line 408A. Thereafter, the state of CMD_OBJ(n) is changed to RES_PENDING in block 410 by the interrupt handler 160. This state is only used the for CRRI B type interface.

Thereafter, the process waits to receive the interrupt INT_RESPONSE from the adapter 116, which indicates that a response is ready for the command. The interrupt handler 160 handles this interrupt and changes the state of command object to COMPLETE in block 412, as shown by the dotted line 410A. The COMPLETE state and the FREE state (block 414) are similar to the states in 312 and 310 that have been described above with respect to FIG. 3. The solid line 412A is similar to 310A, while the dotted line 412B is similar to the dotted line 310B, described above with respect to FIG. 3.

Figure 5:
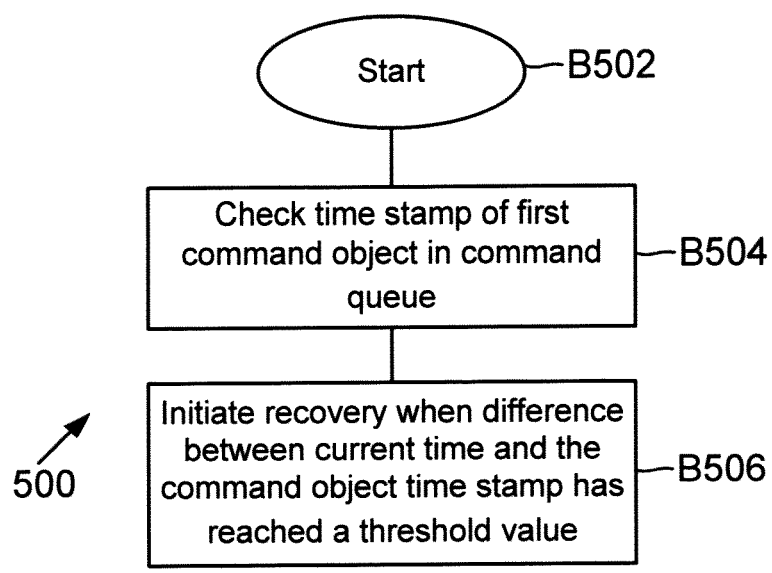
FIG. 5 is a process flow diagram for monitory the health of a command queue, according to one embodiment.

FIG. 5 shows a process 500 for monitoring the overall health of command queue 155 that stores command objects as described above. The process starts in block B502. In block B504, the monitoring module 157 checks the time stamp of a first command object stored at command queue 155. The timestamp may be obtained from field 164E that is inserted when a command is received from an entity, as described above.

In block B506, a recovery process is initiated, when the difference between the timestamp and a "current time" has reached a programmable threshold timeout value. The current time may be maintained by timer module 153. The threshold timeout value may be programmable and stored at a memory location (not shown).

The recovery process involves recovery of adapter 116 command-interface 156 and command-processing module 154. If adapter side command-interface is integrated with firmware 146, then the recovery process may involve the firmware. The embodiments disclosed herein are not limited to any particular recovery process or command type.

Figure 1F:
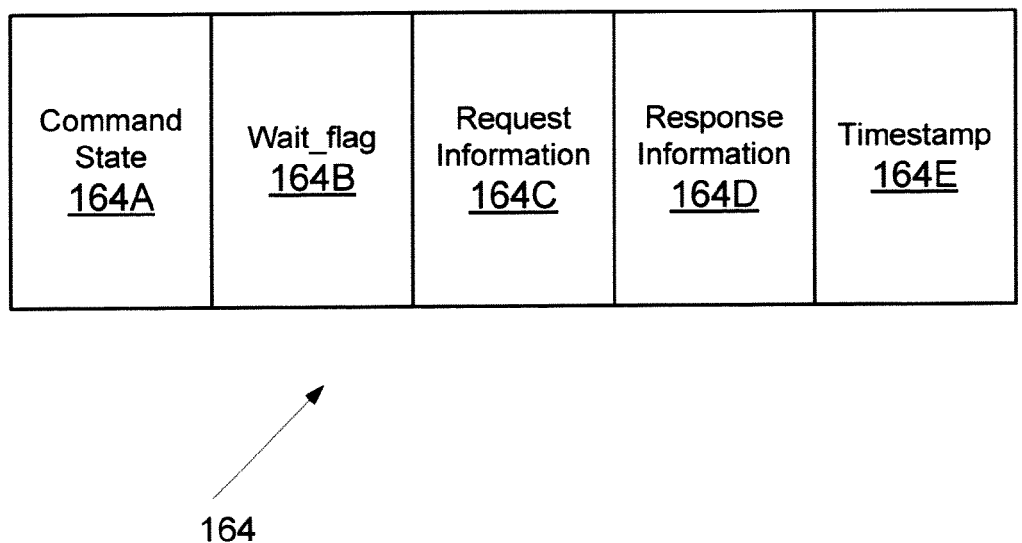
FIG. 1F shows a command object format, according to one embodiment.

The systems and processes described above have various advantages, For example, customized CRRIs are not needed and instead an entity-independent format, as shown in FIG. 1F is used. The command processing module 154 serves different entities to issue commands to the adapter 116, as well as processing responses. Therefore, the entities using the module do not need to know the details around CRRI. Furthermore, a single API is provided for different types of command issuing entities with various characteristics.

In another aspect, any entity can issue command asynchronously to adapter 116. The command processing module 154 manages all the commands and responses. Thus, the entities do not need to expend any resources in synchronizing responses.

The above description presents the best mode contemplated for carrying out the present embodiments, and of the manner and process of making and using them, in such full, clear, concise, and exact terms as to enable any person skilled in the art to which they pertain to make and use these embodiments. These embodiments are, however, susceptible to modifications and alternate constructions from that discussed above that are fully equivalent. Consequently, these embodiments are not limited to the particular embodiments disclosed. On the contrary, these embodiments cover all modifications and alternate constructions coming within the spirit and scope of the embodiments as generally expressed by the following claims, which particularly point out and distinctly claim the subject matter of the embodiments.

What is claimed is:

1. A machine implemented method for processing a command received from a processor executable computing entity from among a plurality of computing entities of a computing system that interfaces with a device, comprising:
   receiving the command by a command processing module executed by a processor of the computing system;
   generating a command object for the command by the command processing module, where the command object format does not change regardless of a computing entity type or a command type;
   placing the command object in a command queue maintained by the command processing module;
   sending the command to a device in a same context as a context of the computing entity, when the command object is a first command object in the command queue with the command that is ready to be sent to the device; and
   sending the command to the device in a different context as the context of the computing entity, when the command object is not the first command object in the command queue with the command that is ready to be sent to the device.

2. The method of claim 1, wherein the command is received by a processor executable application programming interface (API) of the command processing module.

3. The method of claim 2, wherein the API generates the command object for the command.

4. The method of claim 2, wherein the API sends the command to the device in the same context as the context for the computing entity, when the command object is the first command object in the command queue with the command that is ready to be sent to the device.

5. The method of claim 2, wherein an interrupt handler for the command processing module sends the command to the device in the different context as the context of the computing entity, when the command object is not the first command object in the command queue with the command that is ready to be sent to the device.

6. The method of claim 5, wherein the command object includes a flag whose value determines whether the API or the interrupt handler de-queues the command object from the command queue.

7. The method of claim 1, wherein the device is a host bus adapter.

8. The method of claim 1, wherein the device is a network adapter.

9. The method of claim 1, wherein the device is a converged adapter handling both network and storage traffic.

10. A non-transitory, machine readable storage medium having stored thereon instructions for performing a method for processing a command received from a processor executable computing entity from among a plurality of computing entities of a computing system that interfaces with a device, comprising machine executable code which when executed by at least one machine, causes the machine to:
    receive the command by a command processing module executed by a processor of the computing system;
    generate a command object for the command by the command processing module, where the command object format does not change regardless of a computing entity type or a command type;
    place the command object in a command queue maintained by the command processing module;
    send the command to a device in a same context as a context of the computing entity, when the command object is a first command object in the command queue with the command that is ready to be sent to the device; and
    send the command to the device in a different context as the context of the computing entity, when the command object is not the first command object in the command queue with the command that is ready to be sent to the device.

11. The storage medium of claim 10, wherein the command is received by a processor executable application programming interface (API) of the command processing module.

12. The storage medium of claim 11, wherein the API generates the command object for the command.

13. The storage medium of claim 11, wherein the API sends the command to the device in the same context as the context for the computing entity, when the command object is the first command object in the command queue with the command that is ready to be sent to the device.

14. The storage medium of claim 11, wherein an interrupt handler for the command processing module sends the command to the device in the different context as the context of the computing entity, when the command object is not the first command object in the command queue with the command that is ready to be sent to the device.

15. The storage medium of claim 14, wherein the command object includes a flag whose value determines whether the API or the interrupt handler de-queues the command object from the command queue.

16. The storage medium of claim 10, wherein the device is a host bus adapter.

17. The storage medium of claim 10, wherein the device is a network adapter.

18. The storage medium of claim 10, wherein the device is a converged adapter handling both network and storage traffic.

19. A system, comprising:

a memory containing machine readable medium comprising machine executable code having stored thereon instructions; and a processor coupled to the memory to execute the machine executable code for processing a command received from a processor executable computing entity from among a plurality of computing entities of a computing system that interfaces with a device, where the machine executable code is to:

receive the command by a command processing module executed by the processor;

generate a command object for the command by the command processing module, where the command object format does not change regardless of a computing entity type or a command type;

place the command object in a command queue maintained by the command processing module;

send the command to a device in a same context as a context of the computing entity, when the command object is a first command object in the command queue with the command that is ready to be sent to the device; and send the command to the device in a different context as the context of the computing entity, when the command object is not the first command object in the command queue with the command that is ready to be sent to the device.

20. The system of claim 19, wherein the device is one of a host bus adapter, a network adapter and a converged adapter for handling both network and storage traffic.

\* \* \* \* \*